Jan. 1, 1929. Re. 17,181

S. McEWEN

CARBONIZATION OF COAL

Original Filed June 16, 1920 3 Sheets-Sheet 1

INVENTOR
Samuel McEwen
BY
Edwin A. Packard
HIS ATTORNEY

Jan. 1, 1929. Re. 17,181

S. McEWEN

CARBONIZATION OF COAL

Original Filed June 16, 1920 3 Sheets-Sheet 2

INVENTOR
Samuel McEwen
BY
Edwin A. Pastor
HIS ATTORNEY

Jan. 1, 1929. Re. 17,181

S. McEWEN

CARBONIZATION OF COAL

Original Filed June 16, 1920 3 Sheets-Sheet 3

INVENTOR
Samuel McEwen
BY
Edwin A. Rodney
HIS ATTORNEY

Reissued Jan. 1, 1929. Re. 17,181

UNITED STATES PATENT OFFICE.

SAMUEL McEWEN, OF LONDON, ENGLAND, ASSIGNOR, BY MESNE ASSIGNMENTS, TO INTERNATIONAL COAL CARBONIZATION COMPANY, A CORPORATION OF DELAWARE.

CARBONIZATION OF COAL.

Original No. 1,481,140, dated January 15, 1924, Serial No. 389,399, filed June 16, 1920. Application for reissue filed February 11, 1925. Serial No. 8,562.

DIVISION A.

Attempts which have hitherto been made to carbonize finely divided fuel such as coal so as to obtain a comparably subdivided coke have consisted in showering the powdered fuel through a retort externally heated so that the supply of heat is maintained within the retort by transference from the walls of the retort. Such methods are not economical and the capacity of the retorts used is limited by the area of the hot surface required to maintain the contents of the retort at the necessary temperature.

By the present invention the powdered fuel to wit a solid fuel as coal and/or analogous solid fuels is heated while in suspension in an elastic fluid which is caused to travel to delay the settling of the particles by gravitation a length of time to distil from the coal while thus suspended a substantial percentage of its volatile content and under conditions to leave the residuum as carbonized dust—coke—which is ultimately withdrawn, said elastic fluid being maintained at the necessary temperature by heat supplied within the walls of the zone of carbonization.

The elastic fluid may be heated before introduction into the carbonizing chamber or may be products of combustion of gases introduced into the chamber. In the former case the gases produced by the carbonization may be the elastic fluid, and in either case the elastic fluid may be circulated through the carbonizing chamber, due provision being made for separating the carbonized fuel at a suitable point.

The time during which a particle of fuel should be subject to the temperature of carbonization depends on its size. Since strictly uniform grinding is impracticable provision is preferably made for suspension of the coarse particles for a longer period in the heated elastic fluid, than of the finer particles. Thus the gas carrying the particles may be caused to travel upwards in an expanding chamber so that the coarse particles may be delayed by gravity more than the fine particles. Such a provision is also useful for securing a relative movement of the elastic fluid and the particles which it carries, a result obtainable in several other ways, such as by baffles in the path of the fluid.

The accompanying diagrams illustrate the invention when circulation is applied. The parts marked with the same reference letters in the three figures perform the same function.

Figure 1:
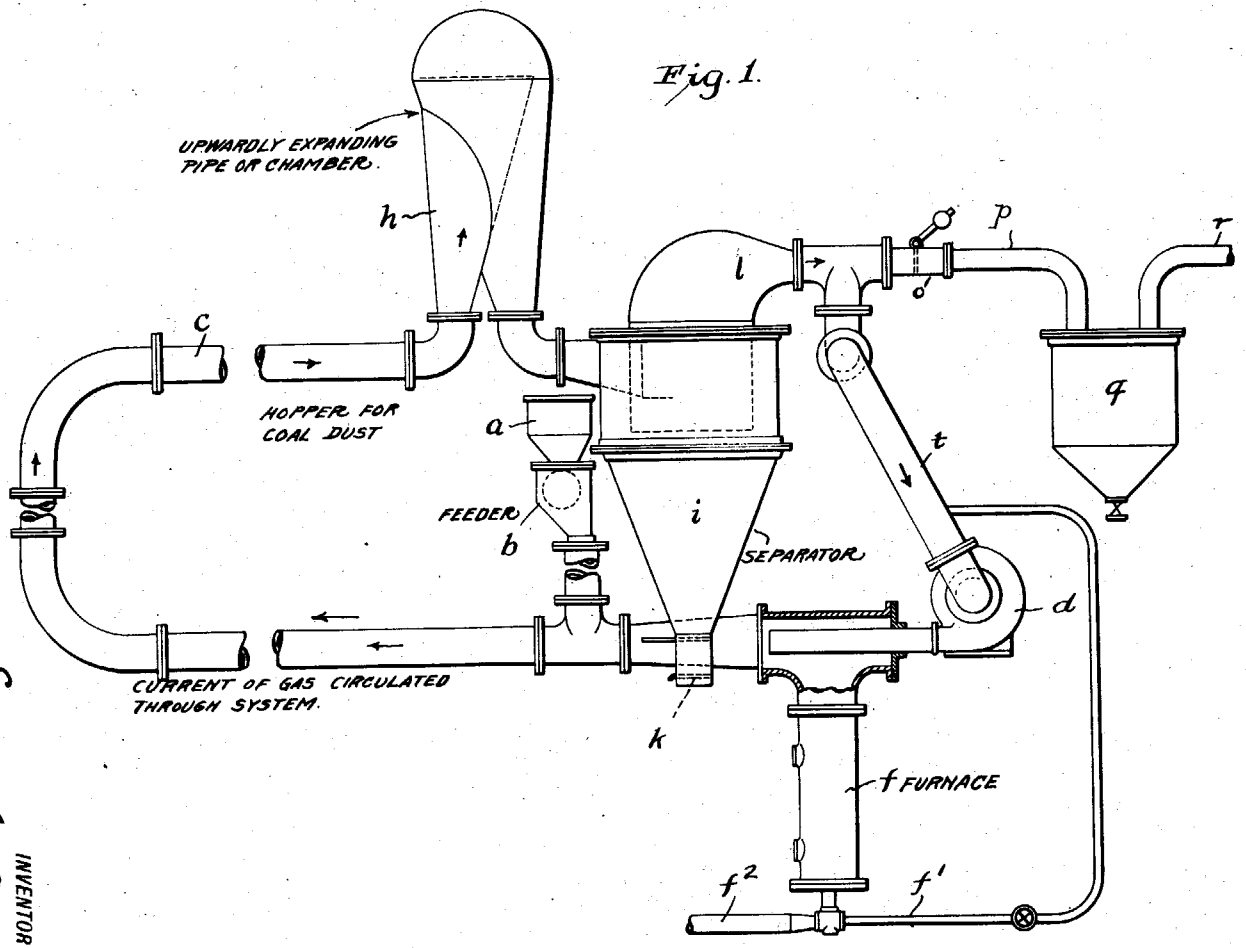
Fig. 1 is a diagrammatic elevation of a form of apparatus in which the volatile products of the carbonization are circulated by means of a fan.

Referring to Fig. 1 coal dust from a hopper *a* is discharged by a gas-tight feeding device *b* into a pipe *c* where it enters a current of gas circulated through the system by a fan *d* in the direction indicated by the arrows.

Between the fan *d* and the coal feed *b* the pipe *c* receives the products of combustion from the furnace *f* fed through a pipe $f^1$ with some of the gas produced, and through pipe $f^2$ with air in such proportion that the mixture of gas and air contains the minimum excess of oxygen above that required to burn the gas. The delivery pipe of the fan *d* extends through the upper part of the furnace *f* so that some of the heat of the products of combustion is used in heating the gas in circulation before it enters the system.

The hot gas having taken up the coal dust carries it in suspension into an upwardly expanding pipe or chamber *h* where the effect already referred to is obtained. Having passed up the expanding chamber the dust and gas descend to enter tangentially into the upper part of a separator *i* constructed like the apparatus commonly known as a cyclone. Here the now carbonized dust collects to be removed by periodically opening the discharge valve *k*, while the gas is discharged along the axis of the separator through the pipe *l* which branches, with one branch *t* that conducts the gas or rather some of the gas into the suction side of the fan *d* while the other branch conducts the rest of the gas away from the carbonizing apparatus.

The volatile products from the coal dust escape through the other branch having the counter-weighted relief valve *o* into a pipe $p$ which conducts them to a condenser $q$, where oils and the like are condensed while the permanent gases pass by pipe $r$ to a gas holder (not shown), a portion of said gases being drawn into the furnace $f$.

The apparatus may be charged at the beginning with gases sufficiently free from uncombined oxygen to avoid explosion and the furnace $f$ may be originally fired with any suitable fuel. The temperature of the system should be about 500 to 800 degrees C. after the admission of the material to be carbonized.

Figure 2:
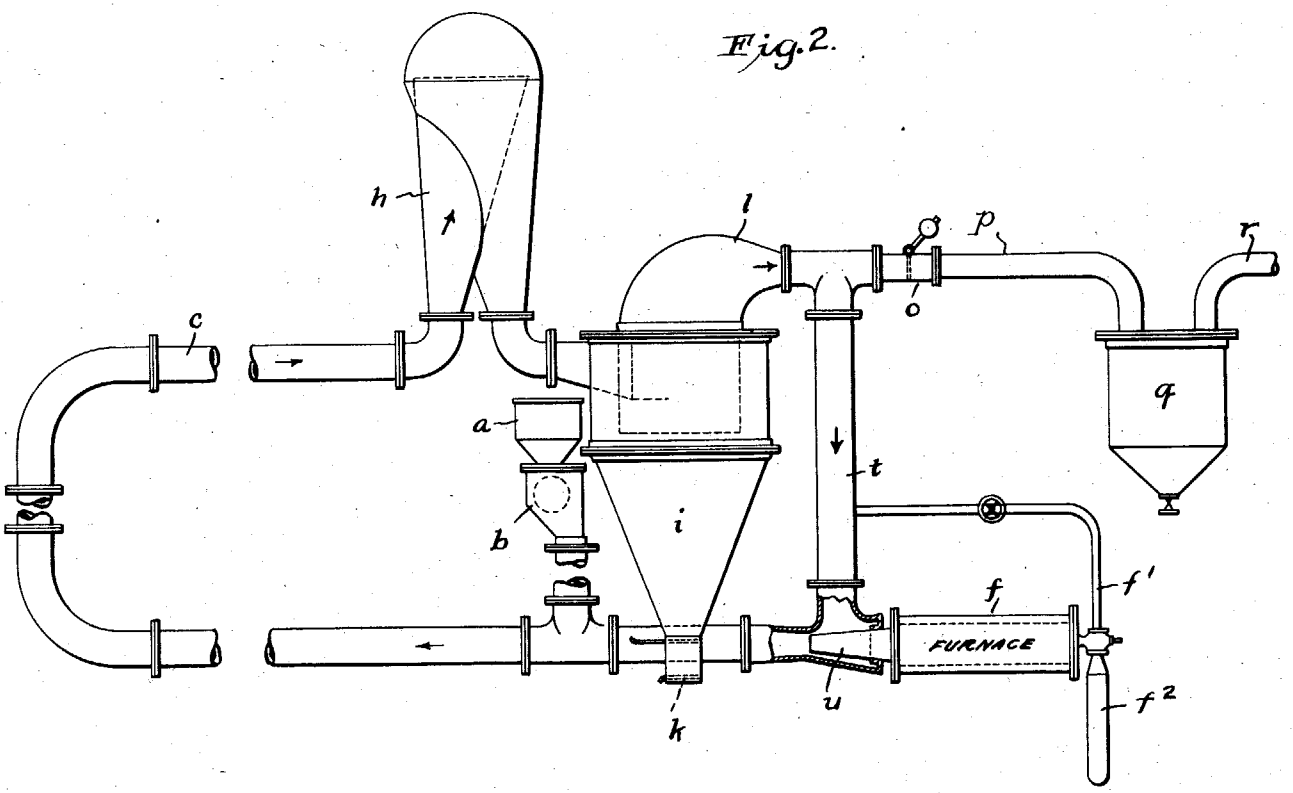
Fig. 2 is a like view of an apparatus in which the circulation is by means of products of combustion issuing through an injector.

In Fig. 2 the products of combustion from the gas furnace $f$ issue into the system through an injector pipe $u$ at a velocity sufficient to maintain the circulation by withdrawing the gas from the separator, $i$, through pipe $t$.

Figure 3:
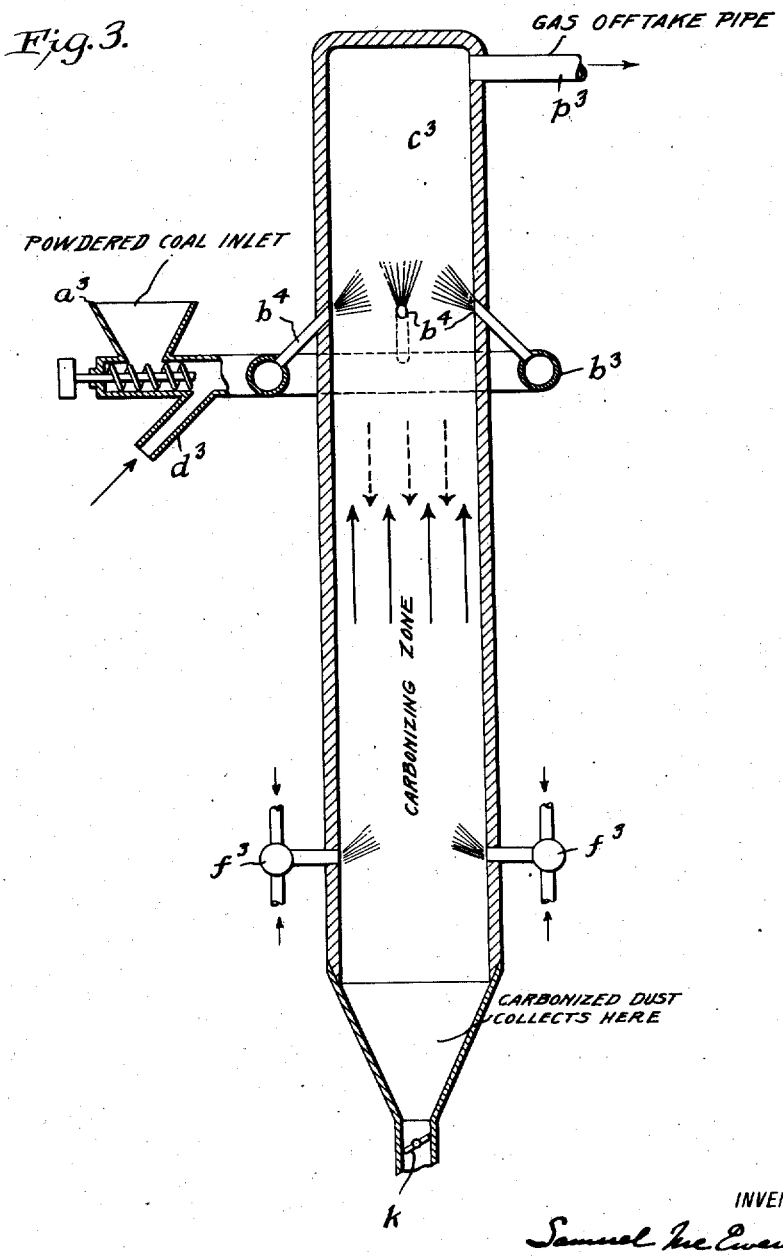
Fig. 3 is a vertical section of an apparatus in which the subdivided fuel is blown into the carbonizing chamber.

Fig. 3 shows a modification in which the fuel is blown into a vertical carbonizing chamber $c^3$ heated by burning gas.

The chamber $c^3$ is surrounded at its upper part with an annular pipe $b^3$ supplied with powdered coal from a hopper $a^3$. Jets $b^4$ form communication between the pipe $b^3$ and the interior of the chamber $c^3$. Into the lower part of the chamber extend gas burners $f^3$.

At the top of the retort a pipe $p^3$ conducts the volatile products of carbonization and the products of combustion from burners $f^3$ through a condensing plant (not shown); a portion of the gases from this plant are returned as by a blower through pipe $d^3$ to the annular pipe $b^3$ to carry the powdered coal through jets $b^4$ into the chamber $c^3$.

Here the particles of coal descend meeting the hot products of combustion rising from the burners $f^3$ which are fed with another portion of the gases from the condensing plant, and according to the arrangement shown in this figure there is a hot gaseous medium or elastic fluid which travels upwardly counter to the gravitating coal particles, in the manner heretofore specified, so as to delay the settling of the particles by gravitation until they have been subjected to the distillation—the temperature within the carbonizing chamber being maintained by heat supplied within the lower portion of the carbonizing zone, as by means of the burners $f^3$ that supply both gas and air to support combustion—, and in fact so as to retard the settling and to hold the coal particles which are fed into the upper portion of the carbonizing zone through pipes $b^4$ in suspension until the carbonization, to wit: partial carbonization is realized, and during this period there is a continuous withdrawal or removal of the gases of the process from the pipe $p^3$ leading from the upper interior portion of the carbonizing chamber $c^3$. The carbonized residue— preferably partially carbonized or partially distilled because it is a residue of relatively low temperature treatment—ultimately reaches the bottom from which it is withdrawn as desired, as by means of a discharge valve indicated by $k$. Coal thus fed and opposed by the counter current of rising hot gases gravitates in the form of a cloud but is retarded in its downward passage due to said upward rising hot gases maintained by combustion taking place within the lower zone of the carbonizing chamber $c^3$.

From the specification it will also be noted that according to the invention the pulverized coal particles are directly acted upon within a carbonizing zone while carried or maintained in suspension within the elastic fluid hot gases—heated so that the temperature of the system is about 500 to 800 degrees C. In other words, at this temperature a low temperature distillation or carbonization of the coal is carried out while and until the coal thus suspended has been subjected to a degree of carbonization. Moreover, according to the process there is driven off a substantial portion of the volatile content of the coal and there is provided combustible gas which is withdrawn or permitted to escape and the solid portion of the coal not converted into gas remains in finely divided form or state, to wit, a residue of carbonized dust which is withdrawn or removed as desired as the process functions by simply opening a suitably constructed discharge valve.

I believe I am the first to carbonize coal, as for example by heating preparatory to and during carbonization by feeding the coal into a current of hot gas, or gases, flowing along and through a pipe leading to a cyclone separator and which hot gas is relied upon to carbonize the coal prior to separating of the solid particles or carbonized product from the gas, with which the solid particles are intimately mixed, with and by the cyclone separator from which the residual coal particles on the one hand and the gases on the other are separately removed.

From what has preceded and from the drawings it will be noted and observed that in the normal functioning of the apparatus or system of Figure 1, or of the apparatus or system of Figure 2, there is a cyclic path which may be referred to as a closed cyclic path within, through, or along which a current of gas circulates; in other words, within this path the circulation of the gas is maintained by suitable means as fan $d$ of Figure 1 or by the functioning of injector pipe $u$ of Figure 2. The cyclic path of the system comprises, is provided with, or includes a carbonizing zone (to wit, a zone wherein the coal, that is fed from the hopper $a$ and feeding device $b$ into the circulating gases, is actually carbonized) and which zone, according to the length of the piping or length of the gas travel, may extend to or even into the space where the actual separation of the hot gas or gases and resulting carbonized dust takes place by means of the cyclonic or centrifugal action of a cyclone which is maintained within the separator.

Having thus described the nature of the said invention and the best means I know for carrying the same into practical effect, I claim:—

1. A process of carbonizing finely subdivided solid carbonizable fuel comprising suspending the finely sub-divided fuel in a gas which is substantially chemically inert with respect to the fuel and is in a chamber and is maintained at a temperature necessary for effecting carbonization of the fuel, which process includes removing a portion of the gases from the chamber, burning the said portion in close proximity to the zone of carbonization and introducing the hot products of combustion into the said zone so that they travel therein in such manner as to delay settling of the particles by gravitation and so that the heat thus introduced by the introduction of the hot products of combustion into the carbonizing zone is substantially the sole source of heat for maintaining within the chamber the temperature necessary for effecting the carbonization of the fuel and collecting in finely subdivided state the carbonized fuel thus produced.

2. A process of carbonizing finely subdivided solid carbonizable fuel comprising suspending the finely sub-divided fuel in a gas in a chamber, which gas is substantially chemically inert with respect to the fuel and is at a temperature necessary for carbonization of the fuel, which process includes removing a portion of the gases from the chamber, burning the said portion in close proximity to the zone of carbonization, introducing the hot products of combustion into the said zone so that they travel in such manner as to delay settling of the particles by gravitation and effect the carbonization of the fuel and maintain heat for the carbonization solely by the heat supplied by the introduction of the hot products of combustion into said zone and then separating the carbonized fuel thus produced from the travelling gaseous products in finely subdivided state and causing a portion of the said gaseous products to continue to travel in a closed circuit and receive fresh fuel and pass through said zone of carbonization, some of the products of carbonization being removed from the apparatus.

3. A process of carbonizing finely subdivided solid carbonizable fuel comprising suspending the finely subdivided fuel in a gas in a chamber, which gas is substantially chemically inert with respect to the fuel and is maintained at a temperature necessary for carbonization of the fuel, which process includes removing a portion of the gases from the chamber, burning the said portion in close proximity to the zone of carbonization, introducing the hot products of combustion into the said zone so that they travel in such manner as to delay settling of the particles by gravitation and, in a portion of their course, in an upward direction with diminishing velocity, then separating the carbonized fuel thus produced from the travelling gaseous products in finely subdivided state and causing a portion of the said gaseous products to continue to travel in a closed circuit and receive fresh fuel and pass through said zone of carbonization, some of the products of carbonization being removed from the apparatus.

4. A process of carbonizing finely subdivided solid carbonizable fuel comprising suspending the finely sub-divided fuel in a gas in a chamber, which gas is substantially chemically inert with respect to the fuel and is maintained at a temperature necessary for carbonization of the fuel, which process includes removing a portion of the gases from the chamber, burning the said portion in close proximity to the zone of carbonization, introducing the hot products of combustion into the said zone so that they travel in such manner as to delay settling of the particles by gravitation and in such a manner that there is relative movement between the particles and the gases and whereby the heat for the carbonization is maintained solely by the hot products of combustion introduced into the carbonizing zone, and then separating the carbonized fuel thus produced from the travelling gaseous products in finely sub-divided state and causing a portion of the said gaseous products to continue to travel in a closed circuit and receive fresh fuel and pass through said zone of carbonization, some of the products of carbonization being removed from the apparatus.

5. The process which comprises feeding pulverized coal into a closed cyclic path providing a zone of carbonization and therein directly subjecting the pulverized coal while carried and maintained in suspension in hot gases which are substantially chemically inert with respect to the coal to the distillation effect of the hot gases so that carbonization of the coal is effected substantially solely by the direct heat from the gases, circulating the hot gases in the closed cyclic path, which gases are maintained at the necessary temperature for carbonization by heat supplied within the zone of carbonization, the temperature of which closed cyclic path is about 500 to 800° centigrade after the admission of the coal thereinto and which hot gases are moving so as to delay settling of the pulverized coal by gravitation until a substantial volatile content is distilled from the coal and until there results carbonized residue, permitting an escape from the cyclic path of some of the gases of the process, and withdrawing the partially carbonized residue.

6. The carbonization of coal by the process which includes feeding pulverized coal into a closed cyclic path having a carbonizing zone and carbonizing the coal solely by the direct heat of a gaseous medium substantially chemically inert with respect to the coal circulating through and along the closed cyclic path, the temperature of which gaseous medium within the closed cyclic path is about 500 to 800 degrees C. after the admission of the coal to be carbonized, causing the gaseous medium to move in a manner to delay settling of the coal particles by gravitation until the coal has been carbonized, maintaining said temperature of said gaseous medium within the closed cyclic path substantially solely by heat supplied within the zone of carbonization, withdrawing some of the gas of the process and collecting the resulting carbonized residue.

7. The carbonizing of coal according to a method in which pulverized coal is fed into a closed cyclic path having therein a carbonizing zone and a maintained cyclone zone, along which cyclic path there is a current of gas circulating, which gas is chemically inert with respect to the coal, the temperature within said cyclic path being about 500 to 800 degrees C. after the admission of the pulverized coal, maintaining the gas circulating so that the pulverized coal is heated substantially solely by the gas circulating along the closed cyclic path and while the coal is in suspension in the circulating gas, which gas is maintained at least up to the stated temperature range by heat supplied within and to the carbonizing zone, causing the resulting hot dust and gas to enter tangentially into the maintained cyclone zone by which the dust is separated from the gas by centrifugal action, withdrawing some of the gas of the process from the cyclic path, and collecting the dust thus separated from the gas as carbonized dust, some of the dust returning to the carbonizing zone for use in maintaining the process.

8. The method comprising feeding pulverized coal to be carbonized into a current of hot gases circulating within and along a closed cyclic path that includes a carbonizing zone and a cyclone zone, within which cyclic path the coal is suspended and carbonized while in suspension in the circulating hot gases as they pass through the carbonizing zone and from which hot gases the carbonized coal dust is separated by the cyclonic action of the cyclone zone and which gases are substantially chemically inert with respect to the coal, maintaining said circulation of the gases within and along the cyclic path, withdrawing some of the gases of the process after the separation of carbonized coal dust therefrom, supplying heat to the circulating gases after the separation of the carbonized dust therefrom by said cyclonic action so as to complete the heat requisite for the carbonization, and withdrawing the carbonized coal dust after said separation.

9. The carbonizing of coal by a method which employs a closed cyclic path having therein a cyclone zone and according to which method pulverized coal is fed into a current of gas circulating through the closed cyclic path, said gas being substantially chemically inert with respect to the coal and the temperature of which circulating gas is about 500 to 800 degrees C. after the admission of pulverized coal, also according to which method the gas circulation is maintained and serves to hold the coal in suspension while being carbonized, the temperature of the circulating gas being maintained up to the stated temperature range by heat supplied within the zone of carbonization and the resulting carbonized product and gas being caused to be separated by cyclonic action of the cyclone zone, the carbonized dust thus separated from the gas being removed and some of the gases being withdrawn while the rest of the gases continue in circulation.

10. The carbonizing of solid carbonizable fuel in finely divided form so as to obtain a subdivided coke by the method which comprises feeding the pulverized solid fuel into a current of hot gases that are substantially chemically inert with respect to the fuel and which gases are circulating along a closed cyclic path providing therein a carbonizing zone including a maintained cyclone zone, the circulation of the hot gases being such as to maintain the coal undergoing treatment in suspension in the carbonizing zone, the temperature of the gases in the cyclic path being about 500 to 800 degrees C. after the admission of the solid fuel to be carbonized and which temperature is maintained up to the lower of said stated temperatures by heat supplied to the zone of carbonization, causing the mixture of solid fuel and gases with which it is intimately mixed to pass tangentially into the cyclone zone so that the solid fuel and the gases are separated by the cyclonic action, and separately withdrawing the resulting solid fuel and some of the gases while allowing other of the gases to continue in circulation.

In witness whereof I hereunto sign my name.

SAMUEL McEWEN.